Patented July 31, 1934

1,968,605

UNITED STATES PATENT OFFICE 1,968,605

KIDNEY EXTRACT FOR TREATMENT OF RENAL INSUFFICIENCY

Benjamin Jablons and Richard I. Wagner, New York, N. Y., assignors to The Chemical Foundation Incorporated, New York, N. Y., a corporation of Delaware No Drawing. Application May 19, 1932, Serial No. 612,377

5 Claims. (Cl. 167—74)

This invention relates to a kidney extract which has certain beneficial properties, and to a method of isolating it.

For a long time it has been thought that the kidney belonged to a group of glands which had both an internal and external secretion. Many attempts have been made to prove the existence of an internal secretion.

Brown Sequard was the first who claimed to have produced a marked improvement in the uremic symptoms of animals, in whom both kidneys were extirpated, by the injection of aqueous extracts of kidney substance. His results were not confirmed, however. Other attempts to isolate this substance were made by Pearce, Aronson and others. Aronson's extract contained choline, and he considered the depressor effect obtained by his extract to be due to this factor.

Bingel and Strauss prepared an extract which produced an elevation of the blood pressure.

Stekskal et al. also produced an extract, which was hypertensive.

Attempts have been made to isolate this depressor substance from urine. Pearce found that urine from nephritics did not contain a hypertensive substance while normal urine did.

Abelous and Barbier, on the other hand, isolated a substance from normal urine which brought about a considerable elevation of blood pressure, and was not identical with adrenalin. Charles Richet, Jr., and Minet have tried to obtain the depressor substance by perfusing extirpated kidney and using the perfusate, but their results have not been conclusive.

We have found that a substance could be extracted by a method which is described below, from normal kidneys of sheep, pigs, dogs and humans, which was not present in diseased kidneys.

The substance is extracted as follows: 500 grams of fresh kidney substance is finely ground after the capsule and fat are stripped away, and to this is added two litres of 95% alcohol, to which is added sufficient sulphuric acid (approximately 5.0 cc.) to bring it up to a pH of 3.5, and is allowed to remain in contact with the ground kidney substance for twenty-four hours, with shaking at frequent intervals. It is then filtered, first through cheesecloth, and then through filter paper. To this filtrate is added precipitated calcium carbonate, the mixture is thoroughly agitated, allowed to stand for several hours, and then filtered through filter paper containing a layer of precipitated calcium carbonate. This filtrate is then concentrated in vacuo at a temperature between 20-25° C. to a syrupy consistency (volume of about 100 cc.). The concentrate is then taken up with 900 cc. of 95% alcohol, allowed to stand in the refrigerator at 4° C. overnight, and a precipitate forms which settles to the bottom.

The precipitate consists mainly of phosphoric acid containing lipoids e. g. lecithine. The supernatant fluid is filtered, and to this is again added the calcium carbonate, as previously described. It is allowed to stand for at least 3-4 hours in the refrigerator. It is then filtered and concentrated in vacuo. The concentrate is centrifuged, the supernatant fluid decanted off, and brought up to the required volume with distilled water, so that 1.0 cc. of the extract represents approximately 15 to 20 grams of original kidney substance. It is allowed to stand in the refrigerator for several days until the sediment (lipoids) separates out and falls to the bottom. The supernatant fluid is decanted and 0.5% phenol or other preservant is added. The mixture is filtered through a Berkefeldt filter N, and put up in sterile containers. A fine precipitate sometimes forms after several weeks' standing which may necessitate a repeated centrifugation.

The calcium carbonate is added to precipitate the sulphuric acid, the fatty acids and several amino acids, which will give insoluble salts. Other salts may be used for this purpose provided that the remaining precipitants can be eliminated or that remaining traces of the salts can be physiologically inactivated.

In the copending application of Richard I. Wagner, one of the present joint applicants, Serial No. 610,705, filed May 11, 1932, for "Gland extracts and method of isolating same", a process of extraction of a physiologically active principle of the kidney is described; and the acid-alcoholic extract thereby isolated is physically and chemically identified. The present invention concerns the discoveries of certain physiological activities of the kidney extract in addition to those described in the aforesaid Wagner application; and of the therapeutically beneficial results, attainable by its administration, hereinafter specified. The present invention also, and more particularly, consists in the discovery that the maximum physiological potency of said extract and its consequent optimum benefit therapeutically are attainable by raising its hydrogen ion concentration point from 3.5 to the approximate value of 6.8, which pH is the criterion of the products as to their physiological characteristics claimed herein, irrespective of the method of their extraction, the above described process being recited only as a preferential illustration of a process of isolation.

In commercial production, the ultrafiltration can be effected by well-known variations in the above-described steps of centrifuging and filtering.

This material as prepared above is a yellowish fluid of a pH 6.8, or almost neutral, which darkens if exposed to air and becomes inactivated. It retains its potency, however, in a sealed container at refrigerator temperature for at least six months, and is still fairly potent after a year.

This material contains no coagulable nitrogen, and no peptone or aminoacids. It does not contain any histamine or choline nor adenylic acid or adenosinic acid. The Biuret and Millon tests are negative, and the Pauli test is positive. The sulfosalicyclic acid and Salkowski tests are negative.

It contains traces of calcium, sodium and potassium. Chlorids are present but practically no sulfates or phosphates. It contains some urea, and reacts according to chemical tests as a dioxyphenol. It crystallizes in monoclin crystals and forms plump needles.

This extract neutralizes adrenalin and pituitrin.

Following injection into the skin a wheal forms, which is followed by redness and swelling with increase of local heat. The surface temperature may be elevated about 5–7° C. above that of the surrounding area. The reddened area extends along the line of the lymphatics and the superficial blood vessels become distended and dilated. This substance prevents the blanching effect of pituitrin and adrenalin in the skin of humans, rabbits and rats in quantitive proportions. Mixed with adrenalin and pituitrin in the proportions indicated below, it prevents the elevation of the blood pressure, the increase in the rate of the heart, and the increased pulse pressure which ordinarily follows their administration. It also inhibits the effect of adrenalin and pituitrin on the smooth muscles of the intestine. It produces a dilatation of the peripheral blood vessels resulting in an elevation of the surface temperature of the body up to 5–7° above the former level. When injected subcutaneously, the lowering of the blood pressure does not manifest itself for from 15 to 30 minutes after the administration. When injected intravenously, depression of blood pressure is almost immediate. The blood pressure drop is invariable; in dogs, in whom nephritic hypertension has been induced, the pressure remains low up to five days after injection. In humans suffering from nephritic hypertension, repeated administration of the extract produces a drop in the systolic blood pressure of from 40 to 100 mm. Hg, and in the diastolic of from 20 to 50 mm. Hg, which remains low for several days and even weeks after cessation of treatment.

This extract when injected subcutaneously, intramuscularly or intravenously into test animals, after a given interval of time (15–30 minutes), will prevent the subsequent rise in blood pressure and tachycardia following the administration of an equivalently potent amount of adrenalin or pituitrin. This neutralization is likewise demonstrable with mixtures of measured amounts of kidney extract and adrenalin. It is possible to standardize the extract against a known amount of adrenalin by this procedure, since this neutralization effect seems to bear a quantitative relationship to the amount of adrenalin or kidney extract used. Ten cc. of the most potent extract prepared to date is equivalent to 1 milligram of crystalline adrenalin.

This extract has also been standardized by determining the amount necessary to neutralize the blanching effect of adrenalin when injected locally into the skin. Excess amounts of kidney extract produce swelling with reddening and dilatation of the superficial blood vessels, whereas excess amounts of adrenalin produce the characteristic blanching, gooseskin, and drop in local temperature.

In humans in whom the extract has been used, there is a definite drop within an hour after injection in the concentration of urea, chlorids and phosphates of the blood. There also follows an increase in the alkaline reserve and in the power of the blood to combine with carbon dioxide. The urine shows an increased output of urea, chlorids and phosphates. The pH of the urine in fasting individuals changes toward the alkaline range. The water balance is likewise affected, in that marked diuresis follows the administration of the extract. The albumen output in the urine in cases of hypertension and nephrosis is appreciably modified as a result of parenteral administration of this extract. Generally it alleviates the symptoms associated with kidney insufficiency.

Further studies indicate that this extract can be used clinically with considerable benefit in conditions associated with vasoconstriction (thrombo-angiitis obliterans) of the peripheral blood vessels, angina pectoris, and other spastic vascular diseases, and especially in nephritis.

Having thus described our invention or discovery, we claim:

1. A substance prepared from fresh kidney and containing an active principle of the organ sufficiently free from injurious substances for repeated administration and having the physiological characteristic of causing a lowering of blood pressure in nephritic hypertension, the said substance being a yellowish fluid which darkens upon exposure to air and becomes inactivated, but retains its potency for at least six months when not so exposed and kept at refrigerator temperature; which reacts according to chemical tests as a dioxy-phenol and crystallizes in monoclin crystals and forms plump needles; and whose pH is about 6.8, being almost neutral.

2. A substance as described in claim 1 which contains no coagulable nitrogen, peptone, aminoacids, histamine, choline, adenylic or adenosinic acid; as to which the Biuret, Millon, Salkowski, and sulfosalycilic acid tests are negative and the Pauli test is positive; and which, upon repeated administration, produces a drop in the systolic blood pressure of from 40 to 100 mm. Hg, and in the diastolic blood pressure of from 20 to 50 mm. Hg, the said pressures remaining low for several days after cessation of administration.

3. A substance as described in claim 1 which contains traces of calcium, sodium and potassium; some chlorids and some urea; practically no sulfates or phosphates; and which, when injected subcutaneously, intramuscularly or intravenously, will prevent the subsequent rise in blood pressure and tachycardia following the administration of an equivalently potent amount of adrenalin or pituitrin, 10 cc. of the extract being the equivalent of 1 mg. of crystalline adrenalin.

4. A substance prepared from fresh kidney and containing in concentrated form that active principle of the organ which has the physiological properties: first, when injected into the skin, of elevating the surface temperature from 5° to 7° C. above that of the surrounding area, and of preventing the blanching effect of adrenalin or pituitrin; second, when injected subcutaneously, of lowering the blood pressure within 15 to 30 minutes; third, when injected intravenously, of depressing the blood pressure almost immediately; and fourth, when injected parenterally, in cases of hypertension and nephrosis, of appreciably modifying the albumen output in the urine; said substance having the physical and chemical characteristics as identified in claim 1, and having the further physical and chemical characteristics of freedom from coagulable nitrogen, peptone, aminoacids, histamine, choline, adenylic and adenosinic acids; and as to which the Biuret, Millon, Salkowski, and sulfosalycilic acid tests are negative; and the Pauli test is positive.

5. A substance prepared from fresh kidney and containing in concentrated form that active principle of the organ which has the physiological properties of causing a definite drop, within an hour after injection, in the concentration of urea, chlorids and phosphates of the blood; of causing a definite increase in the alkaline reserve, i. e. the power of the blood to combine with carbon dioxide; and of causing marked diuresis, the urine showing an increased output of urea, chlorids and phosphates; the said substance having the physical and chemical characteristics as defined in claim 1, and containing traces of calcium, sodium and potassium, some chlorids and some urea; and practically no sulfates or phosphates.

BENJAMIN JABLONS.
RICHARD I. WAGNER.